Patented Dec. 6, 1949

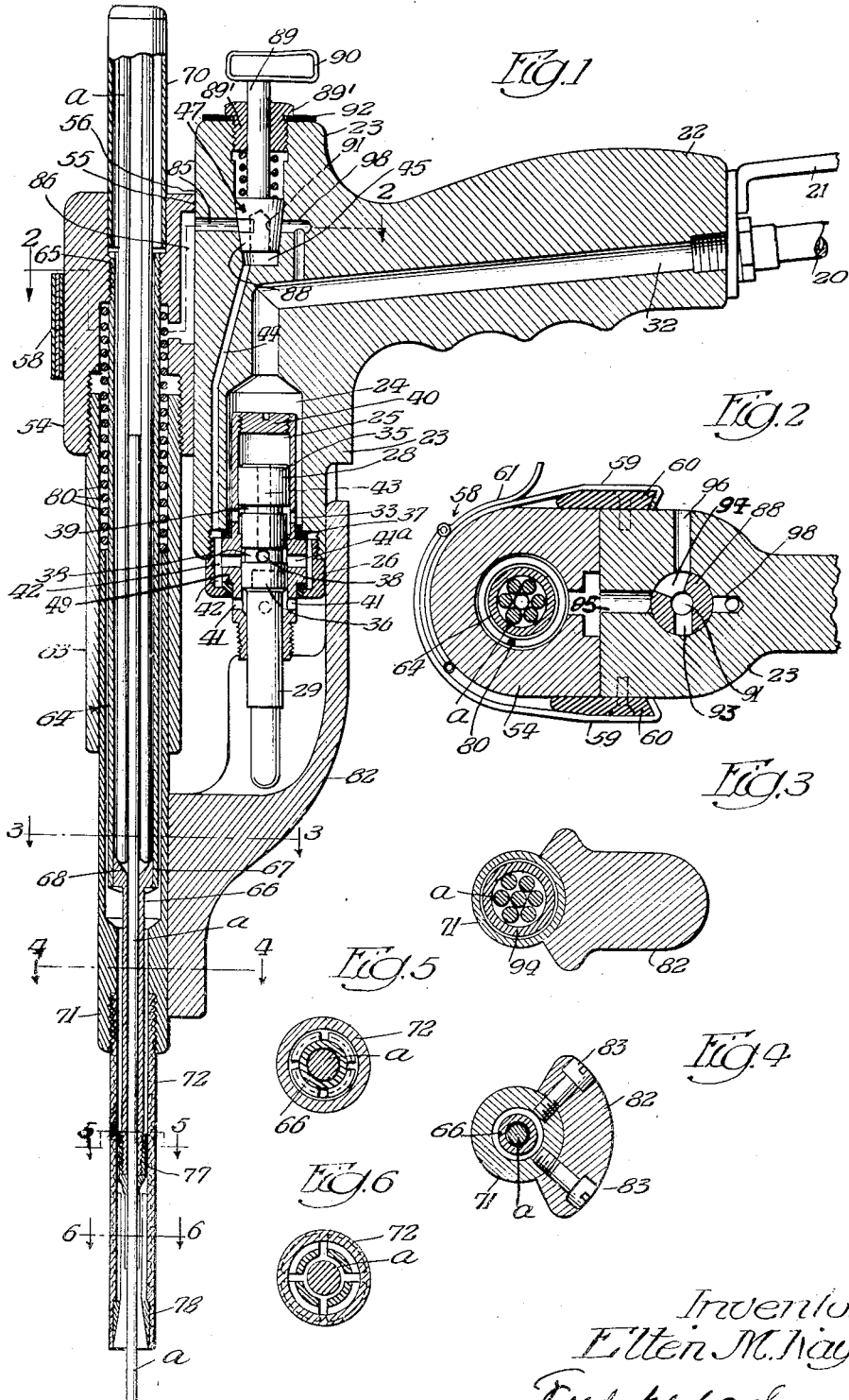

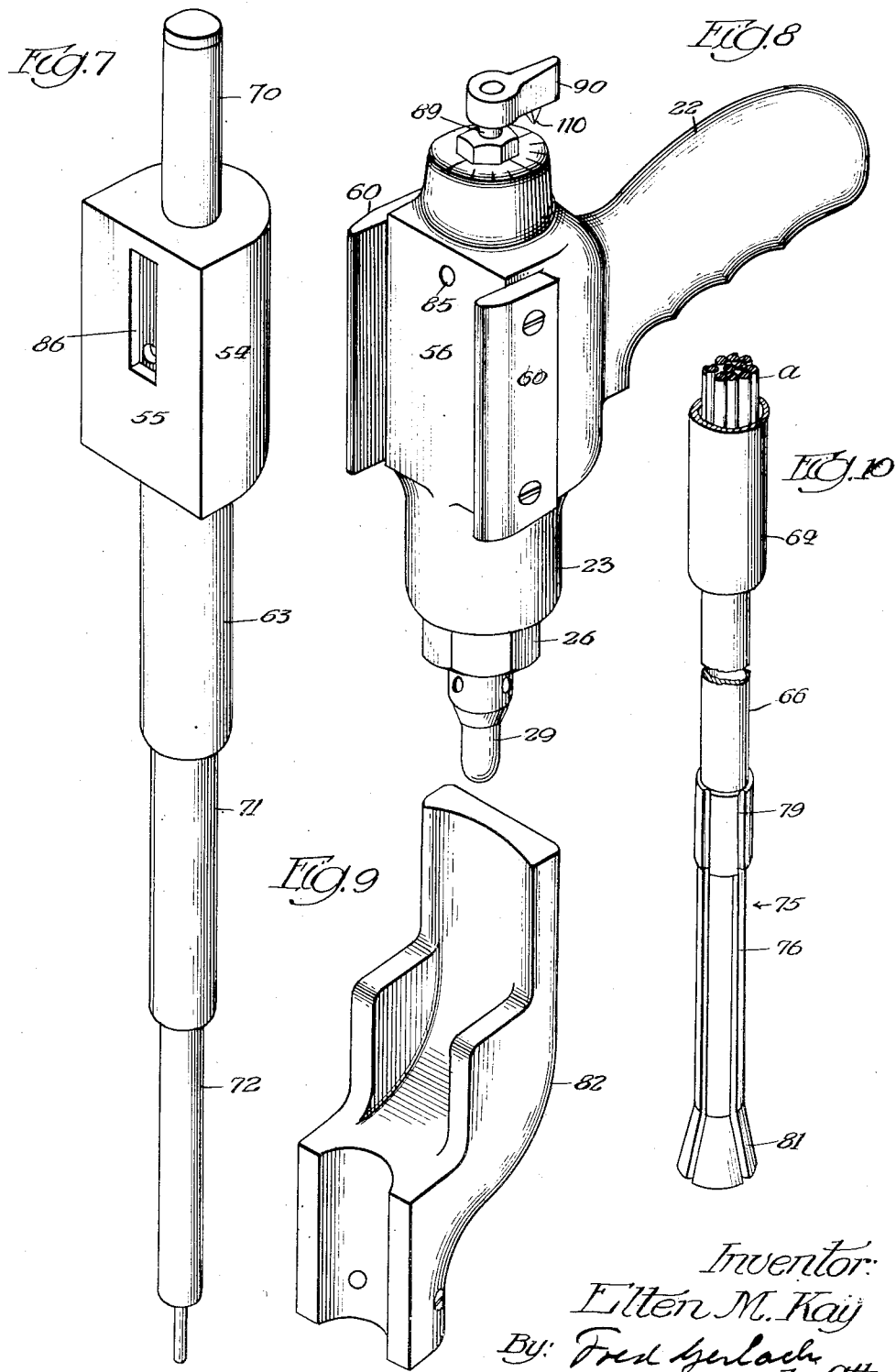

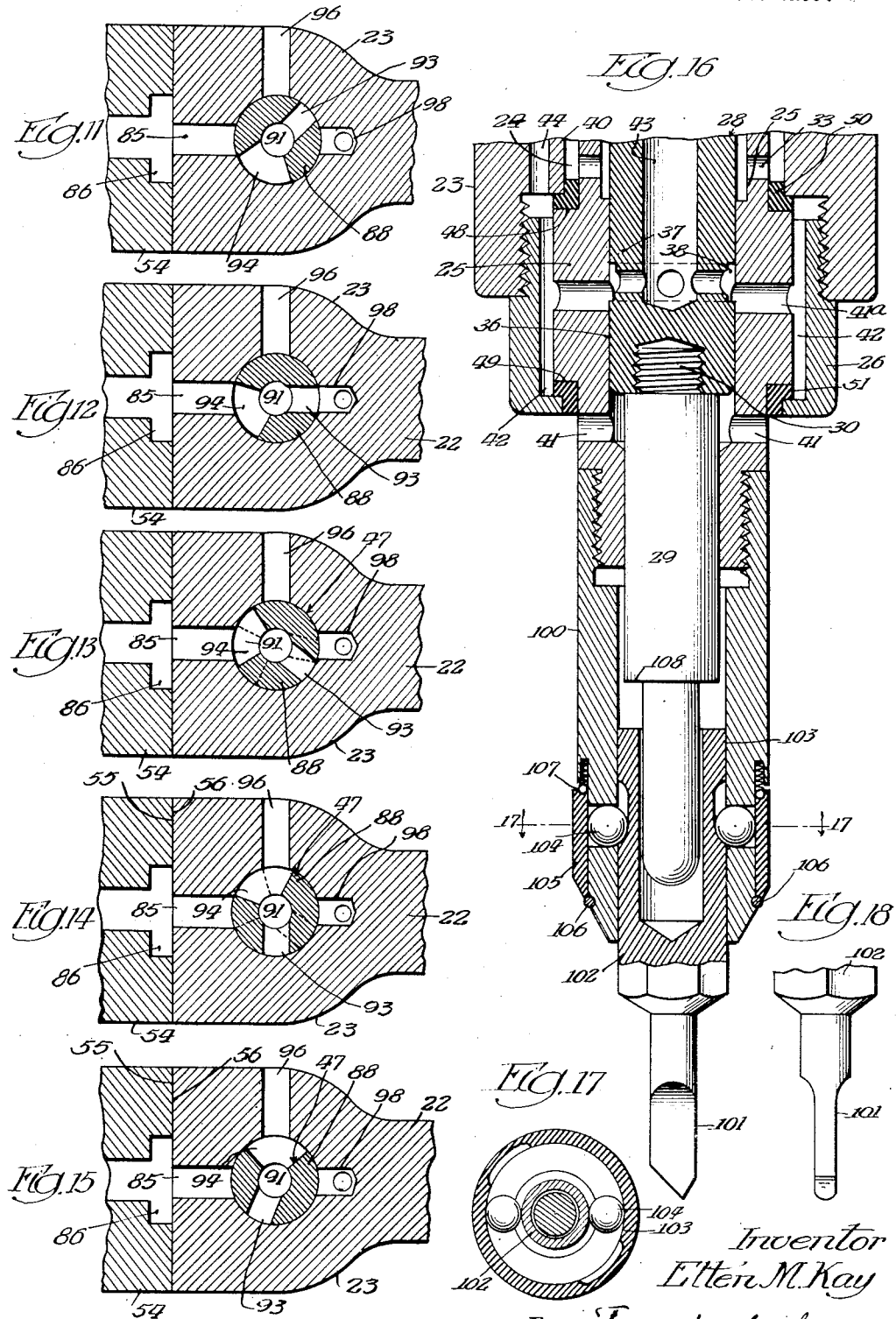

2,490,593

UNITED STATES PATENT OFFICE 2,490,593

COMBINED PORTABLE WELDING AND PNEUMATIC TOOL

Elten M. Kay, Chicago, Ill.

Application February 7, 1945, Serial No. 576,676

13 Claims. (Cl. 219—8)

1

The invention relates to portable welding tools.

In repairing cracked parts or castings by welding, it is usually necessary to first form a channel or pocket for the welding material where the part is cracked or requires repair, which requires the use of a chisel; and then to deposit the welding material in the channel or pocket which is preferably done by vibrating a rod of welding material and passing electric current of low voltage and high amperage through the stick of welding material, and in many instances, it is desirable to peen the deposited weld material to produce a smooth dense surface over the welded portion.

One important object of the invention is to provide a simple and efficient tool which can be interchangeably used for performing these chiseling, welding, and peening operations.

Other objects of the invention are to provide a portable welding tool which includes: a welding rod holder which comprises a magazine for a series of rods which can be successively used for welding; a pulsating hammer operable to impart strokes of variable force, such as light strokes for peening and welding and heavier strokes for chiseling; a welding rod holder which comprises a collet for positively holding the welding rod during welding operations, a pulsating hammer detachably connected to a welding rod holder with a removable shield on the holder for the hammer; a welding rod holder which includes means for delivering air from the hammer to the welds and varying the air flow to provide cooling of the desired degree; a pneumatic hammer in which the intensity of the hammer pulsations is varied by controlling the air exhausted from the hammer; single valve means for variably controlling the operation of the pulsating hammer, variably controlling the flow of air to the electrode cooling means and cutting off the supply of air to the hammer and cooling means; a pneumatic hammer in which the operated tool is insulated to prevent arcing between the tools and the work while carrying on peening or chiseling operations, and avoiding flashes which affect the eyes of the users; a quickly detachable connection between the body of the pneumatic hammer and the welding rod or electrode holder to permit separate use of the hammer for peening or chiseling; and others which will appear from the detailed description.

The invention consists in the several novel features hereinafter described and more particularly defined by claims at the conclusion hereof.

In the drawings:

Fig. 1 is a central section of a tool embodying

2 the invention and assembled for use in welding with vibrations of the welding rod.

Fig. 2 is a section taken on line 2—2 of Fig. 1.

Fig. 3 is a section taken on line 3—3 of Fig. 1.

Fig. 4 is a section taken on line 4—4 of Fig. 1.

Fig. 5 is a section taken on line 5—5 of Fig. 1.

Fig. 6 is a section taken on line 6—6 of Fig. 1.

Fig. 7 is a perspective of the holder for the welding rod or electrode.

Fig. 8 is a perspective of the pneumatic hammer from which the electrode holder is disconnected.

Fig. 9 is a perspective of the shield for the tool on the hammer when the tool is used for welding.

Fig. 10 is a perspective of the collet tube and welding rod holder.

Fig. 11 is a section through the air valve illustrating the position of the valve plug when the air is cut off to the hammer and to the electrode holder.

Fig. 12 is a similar section illustrating the valve plug in position to supply air against exhaust flow from the hammer and thereby stopping pulsation of the hammer-piston while supplying air to the holder for cooling.

Fig. 13 is a similar section illustrating the valve plug in position for supplying air to the hammer and to the cooler.

Fig. 14 is a similar section illustrating the range of adjustment of the valve plug for controlling the supply of air to the holder for cooling while maintaining a constant supply of air to the hammer.

Fig. 15 is a similar section illustrating the valve plug in position to by-pass air from the hammer to atmosphere and for operating the hammer only.

Fig. 16 is a longitudinal section illustrating an adapter for connecting the hammer to a variety of tools.

Fig. 17 is a section taken on line 17—17 of Fig. 16.

Fig. 18 is an end elevation of the chisel point.

The invention comprises generally a pneumatic hammer which includes a body provided with a handle to which are connected a flexible tube 20 for supplying compressed air and a cable 21 for supplying welding current to the body; a holder for welding rods or electrodes detachably connected to the body of the hammer for use of the hammer to produce pulsations during the welding; and a single valve for controlling the air for the operation of the hammer and for controlling the flow of air to the electrode holder to prevent overheating of the parts, to cool the weld, and to control the temperature of the electrode.

The hammer comprises a body 22 provided with a depending tubular member 23 in which a chamber 24 is formed; a cylinder 25 which is provided with annular shoulders by which the cylinder is detachably secured in member 23 by a screw cap 26; a piston 28 slidable in cylinder 25; and a hammer 29 (Fig. 16) which is removably connected by a screw-threaded stem 30 to piston 28. Cylinder 25 is spaced from the wall around chamber 24 and the latter is communicatively connected by a duct 32 with the air supply hose 20. Ports 33 in cylinder 25 admit air from chamber 24 into cylinder 25. The piston comprises an enlarged upper member 35, a lower member 36, and an intermediate member 37 separated by annular channels 38 and 39. The piston is provided with a central longitudinal port 43 which communicates with channel 38 and extends through the upper end of piston member 35. The upper end of cylinder 25 is closed by a screw-plug 40. Radial ports 41 are breather ports preventing vacuum or compression. Radial ports 41a extend through the wall of cylinder 25 for exhausting air from the cylinder to an annular chamber 42 between cap 26 and the outer periphery of the cylinder. In operation, air from chamber 24 enters cylinder 25 through ports 33 and exerts an upward pressure on piston section 35 to impart an upward stroke to the piston. When the piston is raised, channel 38 communicates with ports 33 to deliver air from ports 33 through channel 39 into the central port 43 in the piston to impart the downward stroke thereto. The continuous supply of air to chamber 24 thus produces pulsating movements of the piston and the tool 29 carried thereby to impart vibrations to the body 22 which will be transmitted to the welding rod when the hammer and electrode holder are used together for welding as hereinafter described. Exhaust chamber 42 is communicatively connected by a duct 44 with a chamber 45 of an air valve generally designated 47 which is adapted to control the speed of the piston 28 by controlling the rate of exhausted air. Cylinder 25 is provided with an inner annular shoulder 48 and an outer annual shoulder 49 (Fig. 16). A ring of insulating material 50 is provided between shoulder 48 and the wall around chamber 24, and an insulating ring 51 is provided between shoulder 49 and the cap 26. These rings 50 and 51 insulate the cylinder 25 and the piston 28 therein from the body of the hammer. When the pulsating hammer is used for chiseling or peening, the work and the body of the hammer are sometimes left connected to electric current. It is desirable to prevent arcing between the tool carried by the hammer and the work by insulating the cylinder and piston of the hammer from the hammer body, this arcing is prevented. In practice it has been found that such arcing causes burning away or excessive wear on or damage to the tools or the work, and is also objectionable because it produces flashes which are harmful to the eyes of an operator. The cylinder 25 is spaced from the wall of chamber 24 so that electric current cannot pass between the cylinder and the hammer body.

The welding rod or electrode holder comprises a body or member 54 which is provided with a flat face 55 which fits against a flat face 56 on the hammer body 22. The holder body 54 is detachably connected to the hammer body by a toggle-clip 58 which comprises hooks 59 adapted to engage bars 60 secured to the hammer body and a snap-lever 61 pivoted to the overlapping ends of the hooks 59. This toggle-clip is adapted to lock the holder body 54 on the hammer body 22 with the faces 55 and 56 in tightly abutting relation and permits quick removal of the holder body 54 from the hammer body 22 when it is desired to use the pulsating hammer for other purposes than welding. The tube 63 is screw-threaded into the holder body 54. The holder also comprises a tube 64, the upper end of which is screw-threaded as at 65 into the holder body 54. A tube 66 is fixedly secured as at 67 in the lower end of tube 64 and has an internal diameter corresponding substantially to the diameter of the welding rod or electrode a. The tube 64 having a greater inner diameter than the tube 66 is adapted to function as a magazine for retaining a series of welding sticks or rods to be fed successively to the work. The upper end of tube 66 is conoidal as at 68 to successively direct the rods a into the tube 66 in which a single rod is secured during the welding. The upper end of the magazine is closed by a cap 70, the lower end of which frictionally fits in the holder body 54 and the top of which is closed. A tube 72 is screw-threaded into the lower end of tube 71 and serves as an extension for said tube which coacts with the collet 75 to securely grip the welding rod while welding is being done. Tube 72 is formed of insulating material such as fiber, to prevent arcing if said tube should contact the work. Collet 75 consists of a longitudinally split sleeve 76, the enlarged upper end of which is screw-threaded as at 77 to the lower end of guide tube 66, and wedge sections 81 adapted to be engaged by a wedge ring 78 of hard steel fixed in the lower end of fiber tube 72. Collet 75 is preferably formed of brass held in the fiber tube 72. Longitudinal grooves 79 extend along the upper portion of the collet 75. Tube 71 is slidably guided in the lower end of tube 63 and a compression spring 80 is interposed between a shoulder in the holder body 54 and the upper end of tube 71 which carries the wedge ring 78 and tube 72 so that by reciprocation of tube 71, the collet may be released to expand for releasing the welding rod a and progressively feeding the rod from the holder as it is used on the work. When welding is being done, current passes from cable 21 through the hammer body 22 to holder body 54, tubes 64 and 66, collet 75, and the welding rod to the work which is also connected to the welding circuit. In low voltage, high amperage welding, it has been found advantageous to vibrate the welding rod or electrode, and this vibration is produced by the pulsating hammer during welding. As the welding rod a is consumed, the operator, by pulling upwardly on tube 71, will release the collet 75 and permit the rod to be fed outwardly by gravity or from vibration. As one rod is consumed, another rod in the magazine will automatically pass into the guide tube 66 to the collet 75 so that the entire series of sticks or rods can be successively used. This makes it advantageous to use a series of short rods in lieu of a long rod sometimes used which presents inconvenience in manipulating the rod and hazards due to the long backwardly projecting rod.

A shield 82 is secured by screws 83 to one side of the slidable tube 71 which protects the operator from contact with the vibrating tool 29. This shield 82 also functions as a grip for manually sliding the tubes 71 and 72 and ring 78, thereby releasing the welding rod so that vibration or gravity will feed the rod out of the magazine. Being attached to the tube 71 which is removable from the hammer body, the shield is conveniently removable with the welding rod holder assembly.

In practice, it is desirable to measurably cool the electrode holder adjacent the collet 75 and ring 78 at the lower end of fiber tube 72, the weld spot and also the electrode. The invention provides means for delivering air after it has passed through the hammer into the holder for these purposes. The valve 47 controls the flow of air from chamber 45 to a duct 85 in the hammer body which extends to the face 56 of said body 22. A channel 86 is formed in the face 55 of holder 54 and is adapted to communicatively connect duct 85 and the holder 54 for the delivery of air to the welding rod. Channel 86 is adapted to deliver air into the space between tube 64 and tube 63, between tubes 64 and tube 71 between tube 66 and the lower end of tube 71 between tube 72 and tube 66, through grooves 79, and the longitudinal slots 76 in the collet 75 to the welding rod.

The valve 47 comprises a taper plug 88 rotatably mounted in the hammer body and a stem 89 which is journaled in a bushing 89' and is provided with a handle 90. Tapered plug 88 is provided with a central chamber 91 which communicates with duct 44 to which flows the air exhausted from the hammer. Plug 88 is provided with a radial port 93 and a radial duct 94 and is rotatable into the positions illustrated in Figs. 11 to 15 inclusive, for controlling the operation of the hammer and the flow of air to the welding rod for cooling. A port 96 is formed in the hammer body for by-passing air from valve 47 to atmosphere. When the plug 88 is rotated to the position illustrated in Fig. 11, air from the hammer will be cut off and the hammer will be inoperative and no air will flow to the electrode holder. When plug 88 is rotated to the position illustrated in Fig. 12, a by-pass duct 98 in body 22 admits air from passage 93 in plug 88 and duct 44, which neutralizes the pressure of the incoming air in duct 32 to eliminate pulsation of the piston and allow air to pass to the welding rod. The dotted lines and the solid lines in Fig. 13 of ports 93 and 94 in plug 88 illustrate the range of rotation of plug 88 for control of the pulsation of the piston with the same rate of air flow to the welding rod. Passage 93 may be gradually closed to passage 93 by a clock-wise turn of plug 88 to gradually neutralize the flow of air against the exhaust air flow until the neutralized air is entirely eliminated as illustrated by the solid lines of port 93 in Fig. 13. Port 94 is so constructed that air flow through duct 85 to holder 54 is not changed throughout the entire pulsation adjustment range. The dotted lines and the solid lines shown in Fig. 14 of ports 93 and 94 in plug 88 illustrate the range of control of air to holder 54 for cooling while the same rate of pulsation of the piston is maintained. Port 94 may be turned to gradually close port 85 and gradually open port 96 by a clock-wise turn of plug 88, thereby gradually reducing the flow of air to holder 54 until all cooling air is by-passed to atmosphere through ports 94 and duct 96 thereby completely eliminating the flow of cooling air to the holder 54. When the plug 88 is in the position illustrated in Fig. 15, the air from the hammer will be by-passed through port 96 and only the hammer will be operated. This exemplifies a single valve which controls the exhaust of air from the hammer and is adapted to variably control its speed, to control the delivery of air for cooling the electrode at a variable rate, to by-pass the air exhausted from the hammer to atmosphere when cooling is not desired, and to control the flow of air from the supply and the exhaust to the ducts which carry air to the welding rod.

When the tool is to be used for chiseling a channel in the work, a sleeve 100 which slidably carries a chisel 101 is screw-threaded to the lower end of the cylinder 25, as illustrated in Fig. 16. The chisel is provided with a hexagonal shank 102 which is slidable in a hexagonal chamber 103 in sleeve 100, and the shank is slidably confined in cylinder 103 by a pair of balls 104 which are held in a ring 105 on sleeve 100. A split ring 106 removably holds the ball-retaining-ring 105 on the sleeve. Spring-pressed ball detents 107 yieldingly hold the ring 105 against rotation and permit the ring to be rotated to uncouple the shank 102 from the sleeve 100. When this chisel is used, shoulder 108 on the tool 29 is adapted to abut directly against the inner end of shank 102 for imparting powerful hammer strokes to the chisel as is necessary in removing metal from the work. This exemplifies an adapter by which various tools for example such as those used for chiseling, scarfing, punching, scaling, forming or roughening can be interchangeably used on the hammer when the welding rod holder is removed from the body of the holder.

When the work is to be peened, sleeve 100 is removed from cylinder 25. The tool 29 is adapted to function as a peening tool. When this tool is used, the operation of the hammer may be controlled by the valve 47 to impart vibrations of varying magnitudes.

The device may be used for selectively operating suitable tools for roughening surfaces in preparation for coatings such as metalizing, or metal spraying, to build up metal coatings on surfaces, and also for etching. The control of the air made possible by the settings of valve 47 described makes it possible to vary the magnitude of the pulsations of the hammer piston for imparting light and heavy strokes to different tools according to the character of work to be done. The valve 47 is provided with an index 110 to visually indicate to the operator the air flow for the hammer and holder. All of the outer or exposed surfaces of the hammer body, shield 82, tubes 71, 63, holder body 54, cap 70, are coated with an electrically non-conductive plastic, so that arcing can occur only between the welding stick and the work. The described construction of the tool is such that this coating can be easily applied to these outer surfaces for this purpose so that the arcing will be confined to the point of the welding stick.

The invention is not to be understood as restricted to the details described since these can be varied within the scope of the appended claims without departing from the spirit and scope of the invention.

Having thus described the invention, what I claim as new and desire to secure by Letters Patent is:

1. A portable tool comprising: a holder for a welding stick provided with means for feeding the stick to the work, a body, a pneumatic device mounted in and adapted to impart pulsations to the body, and clamping-means for detachably securing the holder and body together to transmit pulsations from the body to the holder and to permit separation of the body from the holder for the separate use of the device.

2. A portable tool comprising: a holder for a welding stick provided with means for feeding the stick to the work, a body, a pneumatic device mounted in and adapted to impart pulsations to the body, clamping-means for detachably securing the holder and body together to transmit pulsations from the body to the holder, and to permit separation of the body from the holder, for the separate use of the device, and a shield for the said device.

3. A portable tool comprising: a holder for a welding stick and provided with means for conducting air therethrough to an exposed end of the stick, a pneumatic device, a body in which said device is mounted, provided with means for conducting air to said device and from said device to the holder, said holder and body having abutting faces with communicating passages through which air passes from the body into the holder, and means for detachably securing the body and holder together with said faces in abutting relation and to transmit pulsations from the body to the holder and to permit the separation of the body from the holder for the separate use of the device.

4. A portable tool comprising: a holder for a welding stick provided with means for feeding the stick to the work, a body provided with a pneumatic device mounted in and adapted to impart pulsations to the body, said body and holder being adapted to conduct electric current to the stick, means for detachably securing the holder and body together, to transmit pulsations from the body to the holder and to permit separation of the body from the holder for the use of the pneumatic device, and means for insulating said device from the body to prevent arcing.

5. A portable tool comprising: a holder for a welding stick provided with means for feeding the stick to the work and means for conducting air therethrough to one end of the stick, a body secured to the holder, a pneumatic device mounted in and for imparting pulsations to the body, the body being provided with a duct for delivering air to said device and with means for conducting the exhaust from said device into the holder for delivery to said end of the stick, and means for controlling the exhaust from said device to the holder.

6. A portable tool comprising: a holder for a welding stick provided with means for feeding the stick to the work and means for conducting air therethrough to one end of the stick, a body secured to the holder, a pneumatic device mounted in and for imparting pulsations to the body, the body being provided with a duct for delivering air to said device and with means for conducting the exhaust from said device into the holder for delivery to said end of the stick, and means mounted in the body for controlling the exhaust from said device to the holder.

7. A portable tool comprising: a holder for a welding stick provided with means for feeding the stick to the work and means for conducting air therethrough to one end of the stick, a body secured to the holder, a pneumatic device mounted in and for vibrating the body, the body being provided with ducts for delivering air to said device and exhaust from said device into the holder for delivery to said end of the stick, and a duct for by-passing air from the body, and valve-means carried by the body for selectively controlling the exhaust from said device to the holder and by-passing air from the device through the body.

8. A portable tool comprising: a holder for a welding stick provided with means for feeding the stick to the work and means for conducting air therethrough to one end of the stick, a body secured to the holder, a pneumatic device mounted in and for vibrating the body, the body being provided with ducts for delivering air to said device and exhaust from said device into the holder for delivery to said end of the stick, and a duct for by-passing air from the body, and a single valve for selectively controlling the exhaust from the hammer to the holder and by-passing air from the body.

9. A portable tool comprising: a holder for a welding stick, provided with a slidable tube, gripping means for the stick releasable by the tube to feed the stick to the work, a body, a pneumatic device mounted in and for imparting pulsations to the body, a shield for the hammer mounted on the slidable tube, and means for detachably securing the body and holder together to transmit pulsations from the body to the holder and to permit separation of the body from the holder for the separate use of the pneumatic device.

10. A portable welding tool comprising: a holder for a welding stick and provided with means for conducting air therethrough to an exposed end of the stick, a body, a pneumatic device mounted in and for imparting pulsations to the body, said body provided with a duct for conducting air to said device and from said device to the holder, said holder and body having abutting faces through which air passes from the body into the holder, and means for detachably securing the body and holder together with said faces in abutting relation and to transmit pulsations from the body to the holder and to permit the separation of the body from the holder for separate use of the device.

11. A portable welding tool comprising: a holder for a welding stick and provided with means for feeding the stick to the work, a pneumatic pulsating device, a body in which the device is mounted for pulsations, provided with means for conducting air to said device, means for detachably securing the body and holder together to transmit pulsations from the body to the holder and to permit the separation of the body from the holder for the separate use of the pulsating device, and valve-means for selectively controlling the flow of air to said device and varying the magnitude of the pulsations imparted to the body.

12. A portable tool comprising: a holder for a welding stick provided with a slidable tube of insulating material, a body, a pneumatic device mounted in and for imparting pulsations to the body, said body and holder being adapted to conduct electrical current to the stick, means for detachably securing the body and holder together to transmit pulsations from the body to the holder and to permit separation of the body from the holder for the separate use of the pneumatic device, and a plastic coating of insulating material on the outside of the body and the holder for preventing arcing except between the stick and the work.

13. A welding gun comprising a body member, a bore in the body member to support an electrode with its tip projecting therefrom, an air hammer in the body member to vibrate the body member in a direction generally toward and away from the tip of the electrode, and an exhaust port from the air hammer entering upon the bore.

ELTEN M. KAY.

REFERENCES CITED

The following references are of record in the file of this patent:

UNITED STATES PATENTS

| Number | Name | Date |
|---|---|---|
| 516,574 | McGahan | Mar. 13, 1894 |
| 633,852 | Kendrick | Sept. 26, 1899 |
| 1,309,696 | Roberts et al. | July 15, 1919 |
| 1,499,157 | Doty | June 24, 1924 |
| 1,984,809 | Requa | Dec. 18, 1934 |
| 2,361,918 | Baird | Nov. 7, 1944 |
| 2,367,257 | Baird | Jan. 16, 1945 |